United States Patent
Jung et al.

(10) Patent No.: US 10,990,435 B2
(45) Date of Patent: *Apr. 27, 2021

(54) VIRTUAL REDUNDANCY FOR ACTIVE-STANDBY CLOUD APPLICATIONS

(71) Applicants: AT&T Intellectual Property I, L.P., Atlanta, GA (US); The Regents of the University of Colorado, Denver, CO (US)

(72) Inventors: Gueyoung Jung, Belle Mead, NJ (US); Kaustubh Joshi, Scotch Plains, NJ (US); Sangtae Ha, Louisville, CO (US)

(73) Assignees: AT&T Intellectual Property I, L.P., Atlanta, GA (US); The Regents of the University of Colorado, Denver, CO (US)

(*) Notice: Subject to any disclaimer, the term of this patent is extended or adjusted under 35 U.S.C. 154(b) by 32 days.

This patent is subject to a terminal disclaimer.

(21) Appl. No.: 16/571,282

(22) Filed: Sep. 16, 2019

(65) Prior Publication Data

US 2020/0012513 A1 Jan. 9, 2020

Related U.S. Application Data

(63) Continuation of application No. 15/849,155, filed on Dec. 20, 2017, now Pat. No. 10,417,035.

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
See application file for complete search history.

(56) References Cited

U.S. PATENT DOCUMENTS 7,904,540 B2 3/2011 Hadad et al.
8,402,140 B2 3/2013 Zhang et al.
(Continued)

FOREIGN PATENT DOCUMENTS

WO WO 2013/097237 7/2013
WO WO 2016/020731 2/2016
(Continued)

OTHER PUBLICATIONS

Urgaonkar et al., "Resource Overbooking and Application Profiling in a Shared Internet Hosting Platform," Proceedings of the Fifth USENIX Symposium on Operating Systems Design and Implementation, Dec. 2002, pp. 239-254, ACM 2002.
(Continued)

*Primary Examiner* — Hang Pan
(74) *Attorney, Agent, or Firm* — Hartman & Citrin LLC

(57) ABSTRACT

Virtual redundancy for active-standby cloud applications is disclosed herein. A virtual machine ("VM") placement scheduling system is disclosed herein. The system can compute, for each standby VM of a plurality of available standby VMs, a minimum required placement overlap delta to meet an entitlement assurance rate ("EAR") threshold. The system can compute a minimum number of available VM slots for activating each standby VM to meet the EAR threshold. For each standby VM of a given application, the system can filter out any server of a plurality of servers that does not meet criteria. If a given server meets the criteria, the system can add the given server to a candidate list; sort, in descending order, the candidate list by the minimum required placement overlap delta and the number of available virtual machine slots; and select, from the candidate list of servers, a candidate server from atop the candidate list.

17 Claims, 9 Drawing Sheets

(56) References Cited

U.S. PATENT DOCUMENTS

| | | |
|---|---|---|
| 8,589,555 B2 | 11/2013 | Chen et al. |
| 8,762,525 B2 | 6/2014 | Devarakonda et al. |
| 8,804,494 B1 | 8/2014 | Uberoy |
| 8,825,863 B2 | 9/2014 | Hansson et al. |
| 8,959,523 B2 | 2/2015 | Patil et al. |
| 8,984,508 B2 | 3/2015 | Shu et al. |
| 9,104,456 B2 | 8/2015 | Pacheco et al. |
| 9,245,246 B2 | 1/2016 | Breitgand et al. |
| 9,336,030 B1 | 5/2016 | Marr et al. |
| 9,405,572 B2 | 8/2016 | Breitgand et al. |
| 9,454,408 B2 | 9/2016 | Dutta et al. |
| 9,495,196 B2 | 11/2016 | Anderson et al. |
| 9,766,945 B2 | 9/2017 | Gaurav et al. |
| 2011/0225277 A1* | 9/2011 | Freimuth ............ G06F 9/45558 709/223 |
| 2012/0272235 A1 | 10/2012 | Fahrig |
| 2013/0111468 A1 | 5/2013 | Davis |
| 2013/0254762 A1 | 9/2013 | Cochran |
| 2013/0268672 A1 | 10/2013 | Justafort et al. |
| 2016/0156568 A1 | 6/2016 | Naganuma et al. |
| 2016/0179560 A1 | 6/2016 | Ganguli et al. |
| 2016/0342438 A1 | 11/2016 | Cropper et al. |
| 2017/0220365 A1* | 8/2017 | Dow ..................... G06F 9/5088 |
| 2017/0220392 A1 | 8/2017 | Cropper et al. |
| 2017/0286146 A1* | 10/2017 | Voigt .................... G06F 9/5027 |
| 2018/0024537 A1* | 1/2018 | Chauvet ................ G06F 9/4881 718/104 |

FOREIGN PATENT DOCUMENTS

| | | |
|---|---|---|
| WO | WO 2016/075671 | 5/2016 |
| WO | WO 2016/115956 | 7/2016 |
| WO | WO 2016/169166 | 10/2016 |

OTHER PUBLICATIONS

Ortigoza et al., "Dynamic Environments for Virtual Machine Placement considering Elasticity and Overbooking," ArXiv, Jan. 8, 2016.

Caglar et al., "iOverbook: Intelligent Resource-Overbooking to Support Soft Real-time Applications in the Cloud," 2014 IEEE $7^{th}$ International Conference on Cloud Computing, Jun. 27, 2014-Jul. 2, 2014, IEEE 2014.

Bin et al., "Guaranteeing High Availability Goals for Virtual Machine Placement," 2011 $31^{st}$ International Conference on Distributed Computing Systems, Jun. 20-24, 2011, IEEE 2011.

Marshall et al., "Improving Utilization of Infrastructure Clouds," 2011 $11^{th}$ IEEE/ACM International Symposium on Cluster, Cloud and Grid Computing, May 23-26, 2011, IEEE 2011.

Fischer et al., "High availability clustering of virtual machines—possibilities and pitfalls," Paper for the talk at the $12^{th}$ Linuxtag, May 3-6, 2006.

Goudarzi et al., "Energy-Efficient Virtual Machine Replication and Placement in a Cloud Computing System," 2012 IEEE Fifth International Conference on Cloud Computing, Jun. 24-29, 2012, IEEE2012.

U.S. Notice of Allowance dated May 1, 2019 in U.S. Appl. No. 15/849,155.

* cited by examiner

VIRTUAL REDUNDANCY FOR ACTIVE-STANDBY CLOUD APPLICATIONS

CROSS-REFERENCE TO RELATED APPLICATIONS

This application is a continuation of and claims priority to U.S. patent application Ser. No. 15/849,155, entitled "Virtual Redundancy for Active-Standby Cloud Applications," filed Dec. 20, 2017, now U.S. Pat. No. 10,417,035, which is incorporated herein by reference in its entirety.

BACKGROUND

Cloud computing can allow dynamically scalable virtualized resources to be provided as a service. Cloud computing can assure an appropriate level of resources are available to power software applications when and where the resources are needed in response to demand. As a result, cloud computing allows entities to respond quickly, efficiently, and in an automated fashion to rapidly changing business environments.

Virtual machine ("VM") redundancy is the foundation of resilient cloud applications. While active-active approaches combined with load balancing and auto-scaling are usually resource efficient, the stateful nature of many cloud applications often necessitates 1+1 (or 1+n) active-standby approaches that can leave 50% (or more) of VMs idle or nearly so. The active-standby redundancy is one of the oldest yet most ubiquitously used design patterns for both fault tolerance and disaster recovery of modern computer systems. It is parameterized as 1+n redundancy in which one of n cold, warm, or hot spares takes over upon the failure of the single active primary. A range of values of n are common, from 1+1 for disaster recovery, 1+2 to maintain redundancy during lengthy repairs and upgrades, (1+1)+(1+1) (effectively, 1+3) multi-site designs in which a 1+1 standby site backs up another 1+1 primary site, to general 1+n chained replica systems.

Unfortunately, inefficient utilization of resources is standby redundancy's Achilles heel. Keeping the standbys idle (except for synchronizing state) during normal operation results in 50% (for 1+1 systems) or more of a system's peak capacity being wasted. The active-active systems in which all replicas are utilized during normal operation can eliminate wastage, but such designs are practical mostly when replicas are stateless, carry a soft-state that can be recreated in a spare (e.g., stateless web servers backed by a database), or contain a state that can be shared (e.g., key-value stores). For most other stateful systems, standby redundancy continues to be the viable option despite its limitations.

SUMMARY

The concepts and technologies disclosed herein explore a cloud-based solution, wherein standby VMs from active-standby applications are selectively overbooked to reduce resources reserved for failures. The concepts and technologies disclosed herein require careful VM placement to avoid a situation in which multiple standby VMs activate simultaneously on the same host, and therefore all VMs cannot acquire the full resource allocation (i.e., entitlement) required to operate in the active role. Today's cloud computing environments do not have the visibility to the applications necessary to perform such placement. The concepts and technologies disclosed herein describe a novel redundancy-aware VM scheduler that optimizes the placement of active and standby VMs, while assuring applications' resource entitlements and availability. The concepts and technologies disclosed herein can significantly improve resource utilization (i.e., more than 2.5 times than traditional approaches), while minimizing the chance that a VM transition to the active state fails due to resource contention for the entitlement.

According to one aspect, a VM placement scheduling system for managing VM placement scheduling within a cloud computing platform is disclosed. The VM placement scheduling system can compute, for each standby VM of a plurality of standby VMs available in the cloud computing platform, a minimum required placement overlap delta to meet an entitlement assurance rate ("EAR") threshold. The VM placement scheduling system can compute a minimum number of available VM slots in the cloud computing platform for activating each standby VM to meet the EAR threshold. For each standby VM of a given application, the VM placement scheduling system can filter out any server of a plurality of servers operating in the cloud computing platform that does not meet a criteria. If a given server of the plurality of servers meets the criteria, the VM placement scheduling system can add the given server of the plurality of servers to a candidate list of servers. The VM placement scheduling system can sort, in descending order, the candidate list of servers by the minimum required placement overlap delta and the number of available virtual machine slots. The VM placement scheduling system can select, from the candidate list of servers, a candidate server from atop the candidate list.

The cloud computing platform can include a cloud infrastructure. In some embodiments, the cloud infrastructure can include a plurality of data centers. Each data center of the plurality of data centers can include at least one server of the plurality of servers. Each data center of the plurality of data centers can further include at least one server rack. The at least one server rack includes the at least one server of the plurality of servers.

In some embodiments, the VM placement scheduling system can filter out any server of the plurality of servers operating in the cloud computing platform that does not meet the criteria at least in part by checking if a VM placement violates a diversity requirement with a prior placement of a set of final placements of all applications placed within the cloud computing platform. In some embodiments, the VM placement scheduling system can filter out any server of the plurality of servers operating in the cloud computing platform that does not meet the criteria at least in part by checking if choosing the given server of the plurality of servers for a current VM of the given application does not meet the minimum required placement overlap delta. In some embodiments, the VM placement scheduling system can filter out any server of the plurality of servers operating in the cloud computing platform that does not meet the criteria at least in part by checking if the number of available VM slots is greater than or equal to the minimum number of available VM slots. In some embodiments, the VM placement scheduling system can filter out any server of the plurality of servers operating in the cloud computing platform that does not meet the criteria at least in part by checking if a capacity of a given server has been reached. If the given server of the plurality of servers does not meet one or more specific criterions or, in some embodiments, all of the criteria, the VM placement scheduling system can remove the given server of the plurality of servers from further consideration.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
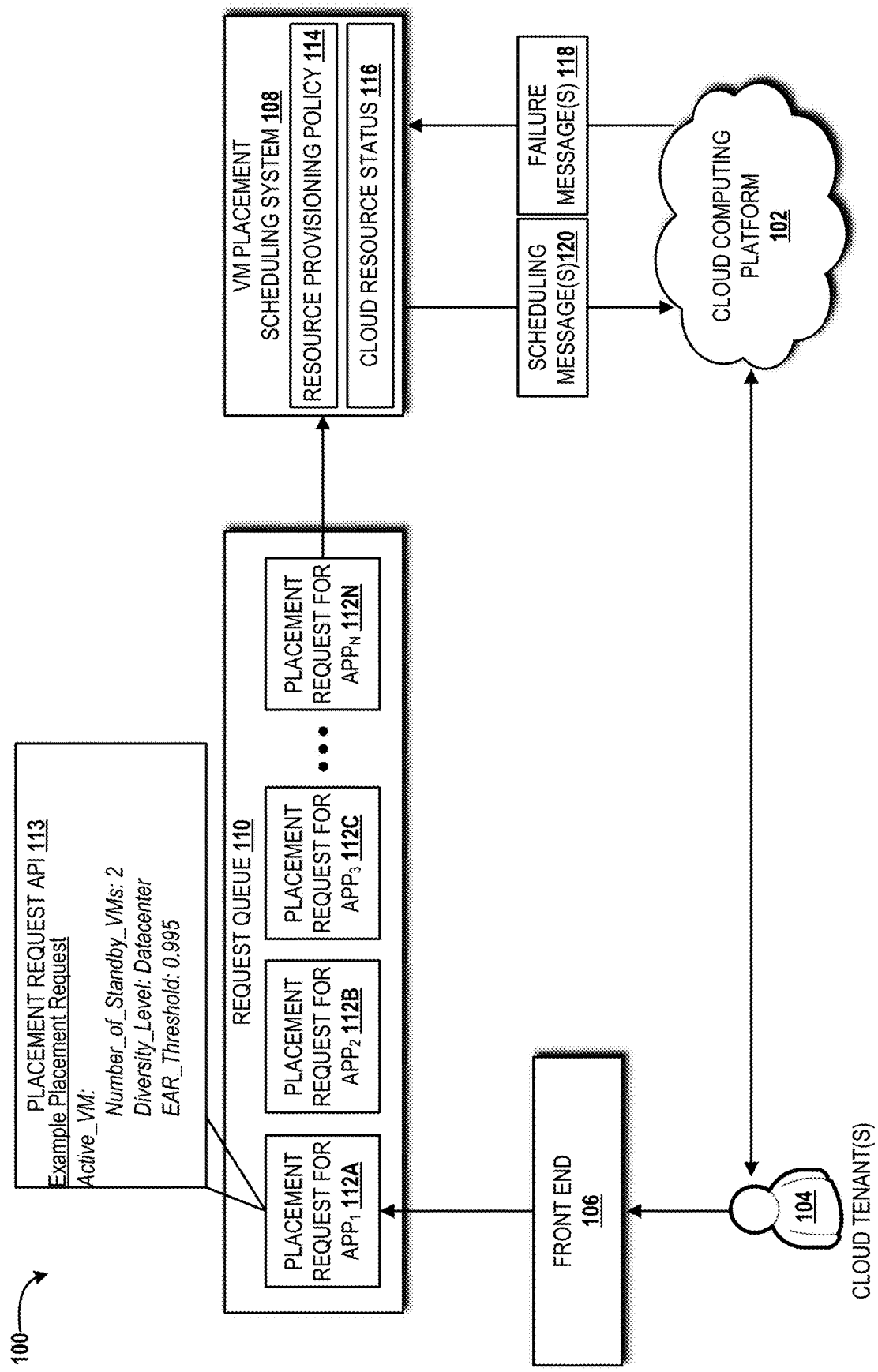
FIG. 1 is a block diagram illustrating aspects of an illustrative operating environment in which embodiments of the concepts and technologies disclosed herein can be implemented.

The idle wastage of standby redundancy can be mostly eliminated by overbooking standbys from multiple independent cloud applications onto the same hosting resources. However, while doing so, the chance that multiple standbys might be activated at the same time on the same host due to a common mode failure affecting their active primaries must be minimized. This situation can lead to performance degradation or even inability of the standby to take the active role due to resource shortage (i.e., losing its entitlement). Fortunately, unlike traditional providers who do not know the failure modes of their customers, cloud computing platforms do have visibility and control over VM placement and failure modes. Thus, through careful placement of active and standby VMs followed by judicious selection of which standby VM to activate, a cloud computing platform can minimize the probability of concurrent activation of multiple standby VMs on the same host. It should be noted that such redundancy-driven over-booking can only be done by the cloud computing platform because tenants do not have the cross application visibility nor the infrastructure topology visibility necessary to perform such operations.

The concepts and technologies disclosed herein provide a novel multi-data center VM placement scheduling system that uses the aforementioned observations to overbook standby VMs from multiple independent applications efficiently with minimal loss in their resource entitlement guarantees and availability by co-optimizing the data center, server rack, and server-level placement of active and standby VMs of multiple independent applications. On active VM failure, the VM placement scheduling system also can select which standby VM to activate if more than one standby VM is available. Using the physical topology of the hierarchical cloud infrastructure that consists of servers, server racks, and data centers, the VM placement scheduling system can identify common mode failures that can impact multiple VMs at the same time. The VM placement scheduling system can utilize additional application information compared to traditional cloud schedulers. Specifically, the VM placement scheduling system can utilize metadata from the applications identifying which VMs are part of an active-standby cluster and the desired availability, and the entitlement assurance rate ("EAR") for the application cluster with the number of standby VMs. Additionally, the input can include the placement diversity level (i.e., either cross-server, cross-server rack, or cross-data center replications that leads to different levels of availability).

Previous cloud overbooking concepts and technologies have focused exclusively on mixing complementary workloads or leveraging time-of-day workload patterns, but these methods are often brittle due to inherent workload unpredictability (especially, the initial application placement time) and are usually shunned by public cloud providers. In contrast, the scheduler's redundancy-driven overbooking has predictable worst case behavior (i.e., resource failure probabilities).

While scheduling methodologies disclosed herein are applicable to a traditional cloud infrastructure having a small number of large sites or even within a single cloud site, it becomes an especially potent way to achieve a designated router in a network distributed cloud, in which the cloud provider has hundreds of small (edge) sites. Implementation of the concepts and technologies disclosed herein can eliminate more than 2.5 times of the wasted idle standby resources, compared to the state-of-art approaches, while preserving the applications' resource entitlements and availability requirements.

The concepts and technologies disclosed herein provide redundancy-driven overbooking in cloud computing environments and extensions to cloud application programming interfaces ("APIs") to enable such overbooking. The concepts and technologies disclosed herein provide placement rules that maximize the cloud resource utilization, while minimizing the impact on applications' entitlements. The concepts and technologies disclosed herein provide optimization algorithms to perform redundancy-aware scheduling across multiple cloud data centers in a hierarchical infrastructure and selection of which standby VM to activate upon failure. The concepts and technologies disclosed herein provide a redundancy-aware scheduler using the optimization algorithms that can seamlessly integrate with existing cloud technologies, such as OPENSTACK.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Referring now to FIG. 1, aspects of an illustrative operating environment 100 in which embodiments of the concepts and technologies disclosed herein can be implemented will be described. The illustrated operating environment 100 includes a cloud computing platform 102 that provides one or more cloud computing services to one or more cloud tenants 104. A cloud computing service is a service provided in accordance with a cloud computing model that enables ubiquitous, convenient, on-demand network access to a shared pool of configurable computing resources that can be rapidly provisioned and released with minimal management effort or service provider interaction. In one embodiment, the cloud computing platform 102 provides, at least in part, Infrastructure as a Service ("IaaS"), through which the cloud tenants(s) 104 can interact with a front end 106 to provision processing, storage, networks, and other computing resources whereby the cloud tenants(s) 104 is/are able to deploy and run software, which can include, for example, operating systems and/or applications. The cloud tenant(s) 104 do not manage or control the underlying cloud infrastructure of the cloud computing platform 102, but have control over operating systems, storage, and deployed applications, and in some implementations, limited control of select networking components (e.g., host firewalls and/or other security components).

The cloud computing platform 102 can include one or more servers, network routers, network switches, networks, applications, and/or other computing resources. The cloud computing platform 102 can include one or more data centers, each of which can include one or more switches and one or more server racks that, in turn, can include one or more servers. An exemplary cloud infrastructure 200 that can be utilized by the cloud computing platform 102 is described below with reference to FIG. 2.

In some embodiments, the cloud computing platform 102 is provided as part of a private cloud infrastructure. A private cloud infrastructure is a cloud infrastructure that is provisioned for exclusive use by a single organization, which can include multiple users. A private cloud infrastructure might be owned, managed, and operated by the organization, a third party, or some combination thereof. A private cloud infrastructure can exist on or off premises. The cloud tenant 104 can access a private cloud infrastructure provided, at least in part, by the cloud computing platform 102 via the front end 106, which can be provided by and/or accessed through a client (introduced in FIG. 2), such as a web client application, or a native client application, for example.

In some embodiments, the cloud computing platform 102 is provided as part of a community cloud infrastructure. A community cloud infrastructure is a cloud infrastructure that is provisioned for exclusive use by a specific community of users from organizations that have shared concerns (e.g., mission, security requirements, policy, and compliance considerations). A community cloud infrastructure might be owned, managed, and operated by one or more organizations in the community, a third party, or some combination thereof. A community cloud infrastructure may exist on or off premises. The cloud tenants 104 can access a community cloud infrastructure provided, at least in part, by the cloud computing platform 102 via the front end 106, which can be provided by and/or accessed through a client (introduced in FIG. 2), such as a web client application, or a native client application, for example.

In some embodiments, the cloud computing platform 102 is provided as part of a public cloud infrastructure. A public cloud infrastructure is a cloud infrastructure that is provisioned for open use by the general public. A public cloud infrastructure might be owned, managed, and operated by a business, academic, or government organization, or some combination thereof. A public cloud infrastructure exists on the premises of the cloud service provider. The cloud tenants 104 can access a public cloud infrastructure provided, at least in part, by the cloud computing platform 102 via the front end 106, which can be provided by and/or accessed through a client (introduced in FIG. 2), such as a web client application, or a native client application, for example.

In some embodiments, the cloud computing platform 102 is provided as part of a hybrid cloud infrastructure. A hybrid cloud infrastructure is a cloud infrastructure that is a composition of two or more distinct cloud infrastructures—private, community, or public—that remain unique entities, but are bound together by standardized or proprietary technology that enables data and application portability. The cloud tenants 104 can access a hybrid cloud infrastructure provided, at least in part, by the cloud computing platform 102 via the front end 106, which can be provided by and/or accessed through a client (introduced in FIG. 2), such as a web client application, or a native client application, for example.

The illustrated operating environment 100 also includes a VM placement scheduling system 108 that receives, from a request queue 110, application placement requests 112A-112N (collectively, "application placement requests 112," or individually "application placement request 112") for various applications. In the illustrated example, the cloud user(s) 104 have submitted, via a placement request application programming interface ("API") 113 called by the front end 106, a placement request for $APP_1$ 112A, a placement request for $APP_2$ 112B, a placement request for APPS 112C, and a placement request for $APP_N$ 112N. After the VM placement scheduling system 108 receives an application placement request 112 from the request queue 110, the VM placement scheduling system 108 consults one or more resource provisioning policies 114 and a cloud resource status 116 for one or more cloud resources available from the cloud computing platform 102 to determine a placement schedule in accordance with which the application requested can be instantiated for execution by one or more VMs operating within the cloud computing platform 102. The cloud resource status 116 can include one or more utilization metrics for one or more of the cloud resources available from the cloud computing platform 102. The cloud resource status 116 can identify any cloud resource failures based upon one or more failure messages 118 received from one or more monitoring systems of one or more data centers operating as part of the cloud computing platform 102. The cloud resource status 116 can include other status(es) associated with the operation of one or more cloud resources in the cloud computing platform 102. The schedule determined for each of the application placement requests 112 can be submitted to the cloud computing platform 102, via one or more scheduling messages 120 and the cloud computing platform 102 can respond as described in greater detail herein below.

The cloud provider of the cloud computing platform 102 can overbook standby VMs executed within one more data centers of the cloud computing platform 102 while assuring the expected entitlement and availability of active-standby applications by extending the application placement request API 113. For redundancy-aware placement scheduling, the application placement request API 113 includes an expected entitlement and an availability assurance, which are converted to an entitlement assurance rate ("EAR") threshold and the number of standbys for the active VM. The EAR threshold represents what the cloud tenants 104 expect with regard to availability and entitlement assurance while standbys are overbooked. In an example implementation of the cloud computing platform 102 provided as part of a private cloud setup, the cloud tenants 104 can estimate an application's availability based on the number of standby VMs and the diversity level. This is similar to existing cloud implementations, such as AMAZON Elastic Compute Cloud, where cloud tenants place VMs in different availability zones (or data centers) with the expectation of certain guaranteed availability. However, in AMAZON Elastic Compute Cloud and similar cloud server provider offerings, tenants place VMs without the standby information and, therefore, with no overbooking. Using standby information, overbooking can be guaranteed for the cloud tenants 104 to obtain full resource allocation (i.e., entitlement for a standby VM to be activated). Additionally, IaaS provided by the cloud computing platform 102 allows the cloud tenants 104 to specify even finer-grained diversity levels (e.g., server or server rack for better network latency yet still high availability).

The concepts and technologies disclosed herein are described in context of an assumption that the placement of a cloud application is requested with one active and n standby VMs (i.e., 1+n active-standbys), and a total of M applications are requested to the cloud computing platform 102. Formally, the set of all VMs of an application $A_i$, ($i \in 1, \ldots, M$) is defined as $A_i = \{v^a, v_1^s, v_2^s, \ldots v_n^s\}$, where $v^a$ is the active VM and $v_j^s$ is the standby VM. All VMs of the application are placed in physical hosts, which are configured in a hierarchical cloud infrastructure of servers, server racks, and data centers. In the example infrastructure illustrated in FIG. 2 (described in detail below), a failure cascades down from the top level. That is, when a data center (or a server rack) fails, all the servers in that data center (or server rack) also fail. In the illustrated example, each server is linked with other servers through a top of rack ("ToR") switch in the same data center or through core switches across data centers.

Figure 2:
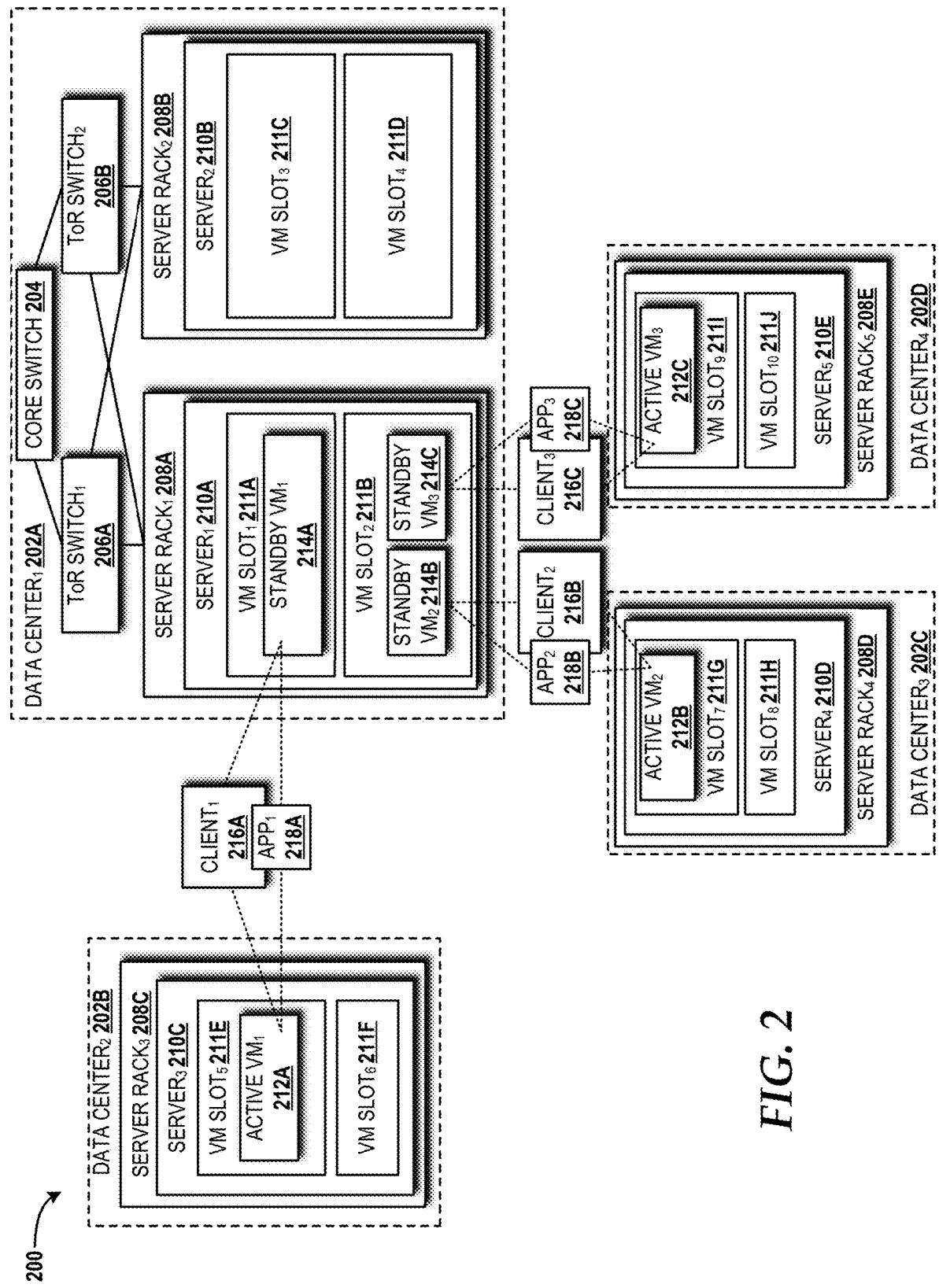
FIG. 2 is a block diagram illustrating aspects of an exemplary cloud infrastructure for an exemplary cloud computing platform, according to an illustrative embodiment.

Turning now to FIG. 2, the exemplary cloud infrastructure 200 for the cloud computing platform 102 will be described, according to an illustrative embodiment. The cloud infrastructure 200 includes a first data center 202A, a second data center 202B, a third data center 202C, and a fourth data center 202D (also referred to herein collectively as "data centers 202," or individually as "data center 202"). The first data center 202A includes a core switch 204 that links together the data centers 202 (although these links are not illustrated so as not to obscure other aspects of the cloud infrastructure 200), and a first ToR switch 206A and a second ToR switch 206B (also referred to herein collectively as "ToR switches 206," or individually as "ToR switch 206") that link together a first server rack 208A and a second server rack 208B (also referred to herein collectively as "server racks 208," or individually as "server rack 208"). The first server rack 208A includes a first server 210A, and the second server rack 208B includes a second server 210B (also referred to herein collectively as "servers 210," or individually as "server 210"). The first server 210A includes a first VM slot 211A and a second VM slot 211B (also referred to herein collectively as "VM slots 211," or individually as "VM slot 211"). The second server 210B includes a third VM slot 211C and a fourth VM slot 211D. The second data center 202B includes a third server rack 208C. The third server rack 208C includes a third server 210C that includes a fifth VM slot 211E and a sixth VM slot 211F. The third data center 202C includes a fourth server rack 208D. The fourth server rack 208D includes a fourth server 210D that includes a seventh VM slot 211G and an eighth VM slot 211H. The fourth data center 202D includes a fifth server rack 208E. The fifth server rack 208E includes a fifth server 210E that includes a ninth VM slot 211I and a tenth VM slot 211J. It should be understood that the configuration shown in FIG. 2 is merely an exemplary example of one possible configuration for the cloud infrastructure 200. Those skilled in the art will appreciate the applicability of alternative configurations for the cloud infrastructure 200. Alternative configurations might contain a different number of data centers 202, core switches 204, ToR switches 206, server racks 208, servers 210, VM slots 211, or a combination thereof. Accordingly, the configuration utilized by the illustrated cloud infrastructure 200 for the cloud computing platform 102 should not be construed as being limiting in any way.

A first active VM 212A (also referred to herein collectively as "active VMs 212," or individually as "active VM 212") is shown operating on the third server 210C in the fifth VM slot 211E; a second active VM 212B is shown operating on the fourth server 210D; and a third active VM 212C is shown on the fifth server 210E. A first standby VM 214A (also referred to herein collectively as "standby VMs 214," or individually as "standby VM 214") is shown operating in the first VM slot 211A on the first server 210A. A second standby VM 214B and a third standby VM 214C are shown operating in the second VM slot 211B on the first server 210A.

A first client 216A has requested placement of a first (1 active VM+1 standby VM, or "1+1") application 218A (also referred to herein collectively as "applications 218" or "apps 218" in the drawings," or individually as "application 218" or "app 218") on the first active VM 212A operating in the fifth VM slot 211E on the third server 210C and on the first standby VM 214A operating in the first VM slot 211A on the first server 210A. A second client 216B has requested placement of a second (1+1) application 218B on the second active VM 212B operating in the seventh VM slot 211G on the fourth server 210D. A third client 216C has requested placement of a third (1+1) application 218C on the third active VM 212C operating in the ninth VM slot 211I on the fifth server 210E. All three of the standby VMs 214A-214C are co-placed in the first server 210A, while each of the active VMs 212A-212C are placed in three different servers 210C, 210D, 210E operating in three different data centers 202B, 202C, 202D. In the illustrated example, each of the servers 210A-210E has a capacity of two VM slots 211, and each VM slot 211 can be used for either one active VM 212 or two standby VMs 214. Each of the clients 216A-216C communicates with the active VM ($v^a$) 212 of a given application 218 or the standby VM ($v^s$) 214 if its active VM ($v^a$) 212 is not available.

A goal of the concepts and technologies disclosed herein is to utilize a given set of cloud resources in a better, more efficient way than is done in current cloud computing platforms. In an effort to attain this goal, the cloud infrastructure 200 is designed to consume less resources (i.e., less VM slots 211) for placement of M number of applications 218. In this manner, the VM placement scheduling system 108 (see FIG. 1) can overbook m number of standby VMs 214 of m different applications 218 into one VM slot 211 with an overbooking rate R. It should be noted that each active VM ($v^a$) 212 is assumed to use a whole VM slot 211 (i.e., not overbooked).

In the example shown in FIG. 2, R is set to two, so up to two standby VMs ($v^s$) 214 can be placed in a VM slot 211 and up to four standby VMs 214 can be placed in a server 210. Five VM slots 211 are used to place all three active VMs 212A-212C and the three standby VMs 214A-214C, while, without overbooking, six VM slots 211 would be required. Based upon this, resource utilization can be defined in accordance with Definition 1 below.

Definition 1:

Given M' number of standby VMs 214 of all applications 218 placed in the cloud infrastructure 200, the total number of VM slots 211 used for all standby VMs 214 is measured as S. Then, the resource utilization is defined as $$\frac{M'}{S}$$

(i.e., the number of standby VMs 214 allocated per VM slot 211).

In fact, the total number of standby VMs 214 that can be overbooked in a given server 210 is restricted by failure probabilities of the hosts (i.e., servers 210, server racks 208, and data centers 202) in the cloud infrastructure 200. Specifically, if a certain number of standby VMs 214 is needed in a given server of the servers 210 to function as active VMs when the servers 210 hosting their original active VMs fail simultaneously, those newly-activated VMs must not be overbooked at this moment, since an active VM 212 requires one whole slot (i.e., entitlement) when it becomes active. The available number of VM slots 211 for standby activations in a given server s 210 is defined herein as $B_s$, which will be described in greater detail herein below. In the example shown in FIG. 2, $B_s$ is set to one, indicating that only one available standby VM 214 can be fully activated at a time, in case of the corresponding active VM 212 failure. Thus, up to three standby VMs 214 can be placed in a given server 210.

An application ($A_i$) 218 is not available if a host of the active VM 212 fails and all hosts of the standby VMs 214 fail simultaneously. Moreover, an application 218 is not fully available if the host of the active VM 212 fails and its standby VMs 214 cannot be assured entitlements due to the overbooking (i.e., all standby VMs 214 share available VM slots 211 with other VMs). For instance, FIG. 2 illustrates that three 1+1 applications 218A-218C have a relatively high chance of being not fully available. In this case, the available number of VM slots ($B_s$) 211 is set to one, and three standby VMs 214 are co-placed in a server rack 208. If two servers 210 hosting active VMs 212 fail simultaneously, two standby VMs 214 cannot be assured for their entitlements. Therefore, the entitlement assurance rate ("EAR") of an application 218 is defined herein in accordance with Definition 2 below, and its formal equation will be described in detail later.

Definition 2:

The EAR of application ($A_i$) 218 is the probability that its active VM ($v^a$) 212 or one of its standby VMs ($v_j^s$) 214 is assured of the entitlement for each time period even with host failures.

The concepts and technologies disclosed herein focus, in part, upon improving EAR, while overbooking the standby VMs 214. To achieve this, the concepts and technologies disclosed herein specifically avoid the possible contention for available VM slots $B_s$ 211 between applications 218 upon simultaneous host failures. Basically, the concepts and technologies disclosed herein ensure failure independence between applications 218 by reducing the placement overlap (i.e., the placement of standby VMs 214 of different combination of applications in each host) among standby VMs 214 of different applications 218. The number of not overlapped VMs between applications 218 is defined as a placement overlap delta ($\Delta$) and will be described in detail below.

The concepts and technologies disclosed herein can maximize the resource utilization (see Definition 1 above) in the cloud infrastructure 200, while meeting the EAR (see Definition 2 above) threshold $T_i$ of each application $A_i$ 218. EAR is affected by the number of available VM slots 211 per server 210 to activate standby VMs 214 (i.e., $B_s$), the placement overlap delta ($\Delta$), and the host diversity in the cloud infrastructure 200.

The concepts and technologies herein can consider additional constraints, including, for example, the latency and throughput between VMs, and the latency between the client 216 and VMs. However, a focus of the concepts and technologies disclosed herein is on VM slot availability and EAR.

The concepts and technologies disclosed herein assume that a standby VM ($v_j^s$) 214 can be used temporarily as an active VM ($v^a$) 212, while the original active VM is repaired. The concepts and technologies disclosed herein also assume that the number of standby VMs 214 overbooked in a server 210 is restricted by an upper bound, since the standby VMs 214 consume an amount of CPU cycles and bandwidth to update the states from the active VMs 212. Finally, the concepts and technologies disclosed herein assume that the number of VM slots 211 and the overbooking rate in a given server 210 is determined by the number CPU cores and other computing resources, such as memory and storage.

An analysis of placement rules and the implications thereof on the EAR and the resources utilization will be described below with reference to the illustrative examples shown in FIGS. 3-5. Two algorithms are also disclosed: (1) an algorithm for VM redundancy-aware VM placement (described in method 600 in FIG. 6); and (2) an algorithm for standby VM selection for activation when its active VM is not available (described in method 700 in FIG. 7).

Placement rules will now be described. The failure probability of a given host is defined herein as $$p_x = \frac{MTTR}{MTBF_x + MTTR}.$$

where MTBFx is the mean time between failure for x level in the cloud hierarchy (i.e., x is a data center 202, server rack 208, or server 210) and MTTR is the mean time to repair. Given the diversity requirement of the placement request API 113 (see FIG. 1), the concepts and technologies disclosed herein avoid co-placing VMs of each application 218 in a single host to increase the application's EAR with failure independency.

Figure 3:
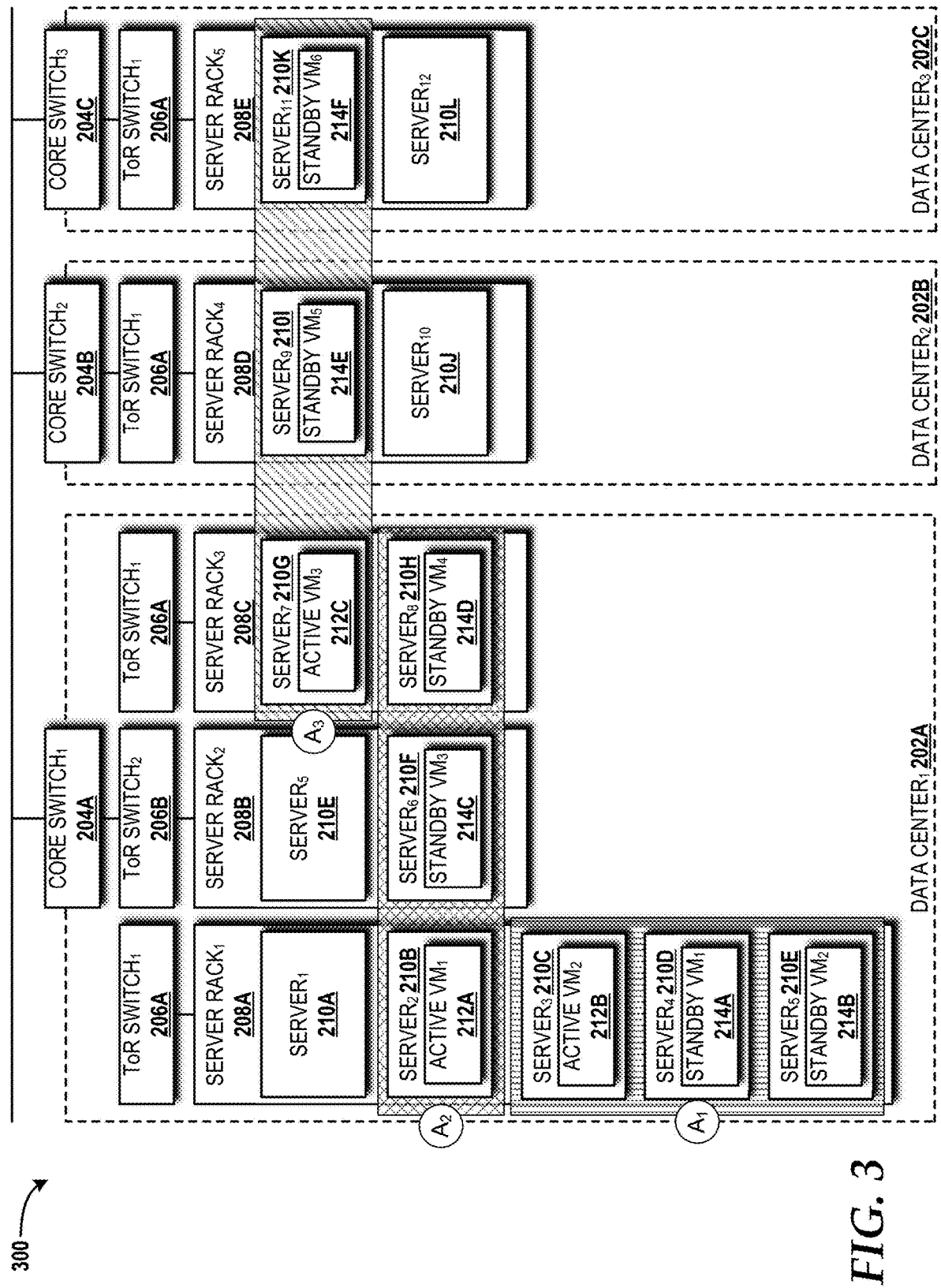
FIG. 3 is a block diagram illustrating aspects of an exemplary placement diversity configuration of the exemplary cloud computing platform, according to an illustrative embodiment.

Turning now to FIG. 3, a placement diversity configuration 300 within the cloud computing platform 102 will be described with reference to the cloud infrastructure 200 components introduced in FIG. 2, according to illustrative embodiments. It should be understood that the placement diversity configuration 300 differs from the configuration shown in FIG. 2, although the same element labeling convention is maintained. For example, the third server 210C in FIG. 2 is shown in the third server rack 208C in the second data center 202B, whereas the third server 210C in FIG. 3 is shown in the first server rack 208A in the first data center 202A.

The placement diversity configuration 300 includes three different diversity placements of 1+2 (i.e., 1 active VM and 2 standbys VM) applications (denoted as $A_1$, $A_2$, $A_3$ in the drawings; can be 1+2 embodiment of the applications 218 introduced in FIG. 2). All VMs of application $A_1$ are placed in different servers 210C, 210D, 210E in the first server rack 208A for server-level diversity. All VMs (active VM 212+ standby VMs 214) of application $A_2$ are placed in different server racks 208A, 208B, 208C in the first data center 202A for server rack-level diversity. All VMs (active VM 212+ standby VMs 214) of the application $A_3$ are placed in different data centers 202A, 202B, 202C for data center-level diversity. While it can be assumed that failures are independent in the same level of a cloud hierarchy, server failures are dependent across levels. For example, if the first data center 202A fails, all server racks (208A-208C in the illustrated example) and all servers (210A-210I1 in the illustrated example) operating in the first data center 202A cannot be accessible. In the example shown in FIG. 3, the applications $A_1$ and $A_2$ are considered not available if the first data center 202A fails. Meanwhile, the application $A_3$ is still available, since a fifth standby VM 214E can be activated in the second data center 202B or a sixth standby VM 214F can be activated in the third data center 202C. With this dependency, the probability that each application cannot be assured for the entitlement (i.e., 1−EAR) based on host failure probabilities can be obtained. In particular, the probability of a single VM failure in a cloud hierarchy is $p_d + p'_d(p_r + p'_r p_s)$, where $p_d$, $p_r$ and $p_s$ are failure probabilities for data center, server rack, and server, respectively, and where $p'_d = 1 - p_d$ and $p'_r = 1 - p_r$. This implies that a single VM failure arises when either the data center 202, the server rack 208, or the server 210 where that VM is hosted fails.

The probability $\gamma_d$, which a 1+n application fails for the entitlement assurance with data center-level diversity is equivalent to that of all 1+n data centers (or 1+n server racks or 1+n servers), which host VMs, fail.

$$\gamma_d = (p_d + p'_d(p_r + p'_r p_s))^{1+n} \quad (1)$$

For server rack-*level diversity, the probability $\gamma_r$ is either (a) the data center fails or (b) 1+n server racks (or 1+n servers) hosting all VMs fail.

$$\gamma_r = (p_d + ?p'_d(p_r + p'_r p_s))^{1+n} \quad (2)$$

For the server level diversity, the probability $\gamma_s$ is either (a) the data center fails, (b) the server rack fails, or (c) all 1+n servers fail.

$$\gamma_s = p_d + p'_d(p_r + p'_r p_s^{1+n}) \quad (3)$$

The impact of overbooking based upon resources utilization and EAR will now be described. To improve the resource utilization as defined in Definition 1 above, the concepts and technologies disclosed herein attempt to overbook as many standby VMs 214 in a given server 210 as possible. However, the maximum overbooking number in a server 210 ($B_s^{max}$) is restricted by the number of available VM slots 211 (cores) to be used for activating standby VMs 214 with the entitlement upon the original active VMs' failures ($B_s$). For example, assume the server s has a total of C cores and the overbooking rate per core is R. With a $B_s$, $B_s^{max}$ can satisfy:

$$B_s + \frac{B_s^{max} - B_s}{R} \leq C \quad (4)$$

Therefore, $$B_s^{max} \leq CR - B_S(R-1) \quad (5)$$

Consequently, the resource utilization (based on $B_s^{max}$) linearly decreases as more standby VMs are allowed to be activated (based on $B_s$—i.e., increase EAR). This tradeoff is illustrated in FIG. 4.

Figure 4:
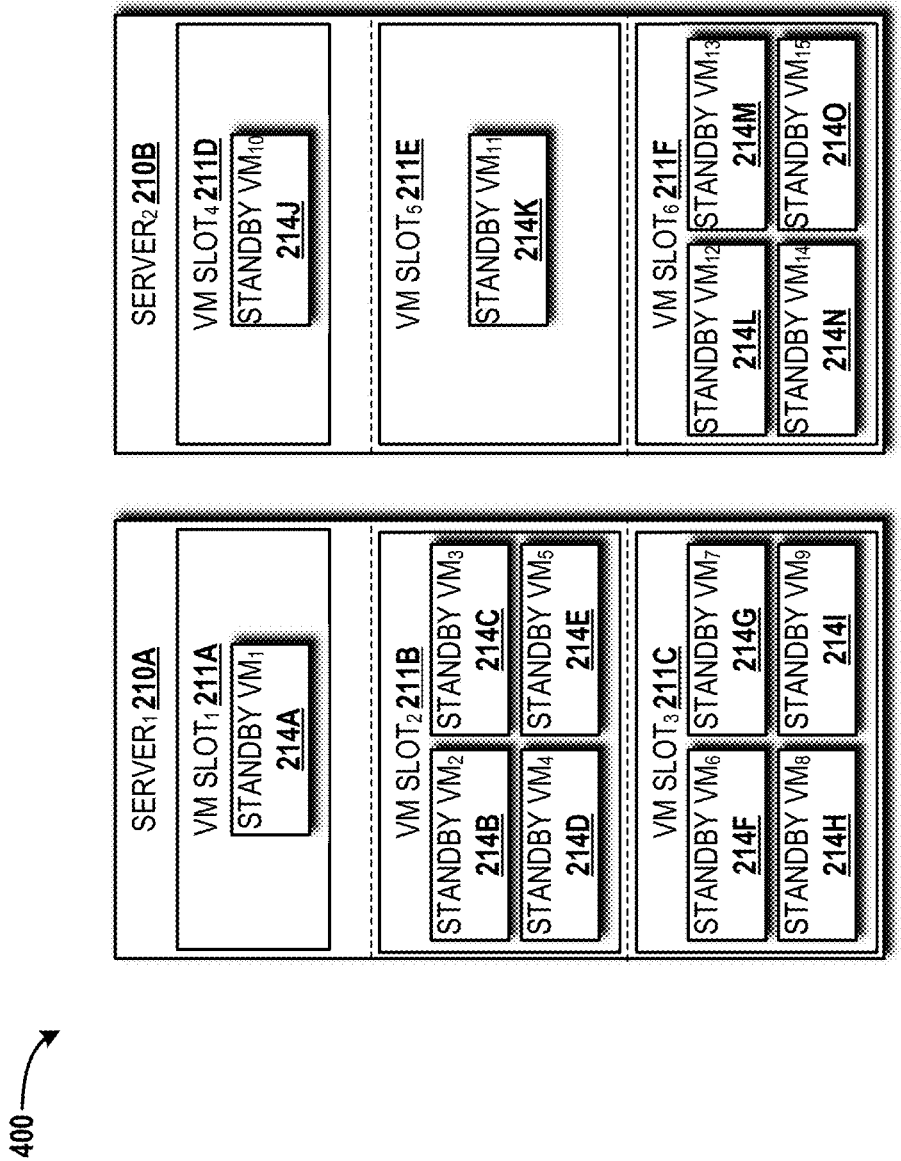
FIG. 4 is a block diagram illustrating aspects of an exemplary standby overbooking configuration of the exemplary cloud computing platform, according to an illustrative embodiment.

Turning now to FIG. 4, a standby overbooking configuration 400 within the cloud computing platform 102 will be described with reference to the cloud infrastructure 200 components introduced in FIG. 2, according to illustrative embodiments. It should be understood that the standby overbooking configuration 400 differs from the configuration shown in FIG. 2, although the same element labeling convention is maintained.

The standby overbooking configuration 400 illustrates the aforementioned tradeoff with two servers 210A, 210B hosting all standby VMs 214 for 1+1 applications 218 (not shown). The standby overbooking configuration 400 assumes R is set to 4, and C is set to 3. Based on equation (5) above with the number of available VM slots 211 for activations ($B_1=1$), the first server 210A can host up to 9 standby VMs 214A-2141. In this case, the first server 210A can assure the entitlement (i.e., a whole VM slot 211) of only one standby VM 214A upon active VM 212 (not shown) failure. Meanwhile, based on equation (5) with $B_2=2$, the second server 210B can only host up to 6 standby VMs 214J-214O, but can assure the entitlements of two standby VMs 214J, 214K.

When computing the probability of failure with entitlement assurance for a 1+1 application $A_i$ 218 in the standby overbooking configuration 400, two cases can be considered. In a first case, one server 210 hosting an active VM 212 (not shown) of the 1+1 application $A_i$ 218 fails and one server 210 hosting its standby VM 214 fails. In the second case, the server 210 hosting the active VM 212 of the 1+1 application $A_i$ 218 fails and the server 210 hosting the active VM 212 of another 1+1 applications fails. In an example of the second case involving the first server 210A, more than two standby VMs 214 in the first server 210A will contend for activation due to $B_1=1$. The probability of the first case depends on the placement diversity of the application $A_i$ 218, and then $\gamma_d$ in equation (1), $\gamma_r$ in equation (2), or $\gamma_s$ in equation (3) is applied for data center-level diversity, server rack-level diversity, or server-level diversity. For the second case, the contention probability of $A_i$ can be formally expressed as:

$$\gamma = p'_d p'_r p'_s q_x{}^n \text{Comb}(B-1, B_s, q_y{}^{mB_s}) \qquad (6)$$

The term $p'_d p'_r p'_s$ is the probability that the server 210 hosting the standby VM 214 of the application $A_i$ 218 works, and $q_x{}^n$ is the probability that the server(s) 210 hosting the remaining n VMs of $A_i$ fail. Here, the probability $q_x$ depends on the diversity of $A_i$ with the condition $p'_d p'_r$. That is, if the diversity is server-level, n servers 210 hosting n VMs of $A_i$ are in the same data center 202 and the same server rack 208 with standby VMs 214, where the n servers 210 do not fail with probabilities $p'_d p'_r$. Thus, $q_x$ is $p_s$. Similarly, in rack-level diversity, $q_x$ is $p_r + p'_r p_s$; and in data center-level diversity, $q_x$ is $p_d + p'_d(p_r + p'_r p_s)$. The term $q_y{}^m$ represents the probability that the servers 210 hosting m VMs of another application will fail, and thereby one of its standby VMs 214 contends for the entitlement with $v_j{}^s$ of the application $A_i$ 218. Similar to $q_x$, $q_y$ is either $p_s$, $p_r + p'_r p_s$ or $p_d + p'_d(p_r + p'_r p_s)$ depending on its diversity with $p'_d p'_r$. At least $B_s$ standby VMs 214 out of all standby VMs 214 sharing the server 210 contend with $v_j{}^s$ of $A_i$ to take the $B_s$ VM slots 211. Thus, the concepts and technologies disclosed herein consider the combination of $B_s$ VMs out of B−1 such standby VMs 214 that is represented as $\text{Comb}(B-1, B_s, q_y{}^{mB_s})$ in equation (6).

In an example of the second case involving the second server 210B with server-level diversity, the contention probability can be expressed as $$\binom{5}{2} p'_d p'_r p'_s p_s p_s^2,$$

where $p'_d p'_r p'_s p_s$, is the probability that the second server 210B hosting the standby VM 214 of the 1+1 application 218 works, but the server 210 hosting the other VM (i.e., the active VM of the application) fails. Meanwhile, $$\binom{5}{2} p_s^2$$

is the probability that servers 210 hosting two active VMs 212 of two out of five other applications 218 fail.

Note that it can be considered that more than $B_s$ standby VMs 214 contend for $B_s$ VM slots 211 caused by more than $B_s$ VMs's failures in equation (6). However, such probabilities are negligible. In the above example, when $p_s$ is 0.01, $p_s^2$ is 0.0001 while $p_s^3$ is 0.000001. Thus, approximate computations can be made with $B_s$ simultaneous failures.

The impact of the placement overlap on the application EAR will now be described. The placement overlap delta $\Delta$ is defined as the number of VMs of an application $A_i$, which VMs are not co-placed with VMs of other applications in the same host. Turning now to FIG. 5, a placement overlap configuration 500 within the cloud computing platform 102 will be described with reference to the cloud infrastructure 200 components introduced in FIG. 2, according to illustrative embodiments. It should be understood that the placement overlap configuration 500 differs from the configuration shown in FIG. 2, although the same element labeling convention is maintained.

The placement overlap configuration 500 illustrates how four 1+2 applications ($A_1$ to $A_4$ in the drawings; can be a 1+2 embodiment of the applications 218 introduced in FIG. 2) placements are overlapped with each other in six data centers 202A-202F with the data center-level diversity. Suppose that the overlap delta $\Delta$ for the application $A_1$ needs to be at least two, the placements of $A_2$ and $A_3$ meet this criteria since two VMs of $A_1$ are placed in different data centers 202B, 202C from the VMs of $A_2$ and $A_3$, but with $A_4$, $\Delta$ for $A_1$ is not met since all VMs of $A_1$ are placed with VMs of $A_4$ in the same data centers 202 (i.e., all VM placements are overlapped). Meanwhile, when $\Delta$ for $A_2$ needs to be at least one, all application placements meet this criteria.

Figure 5:
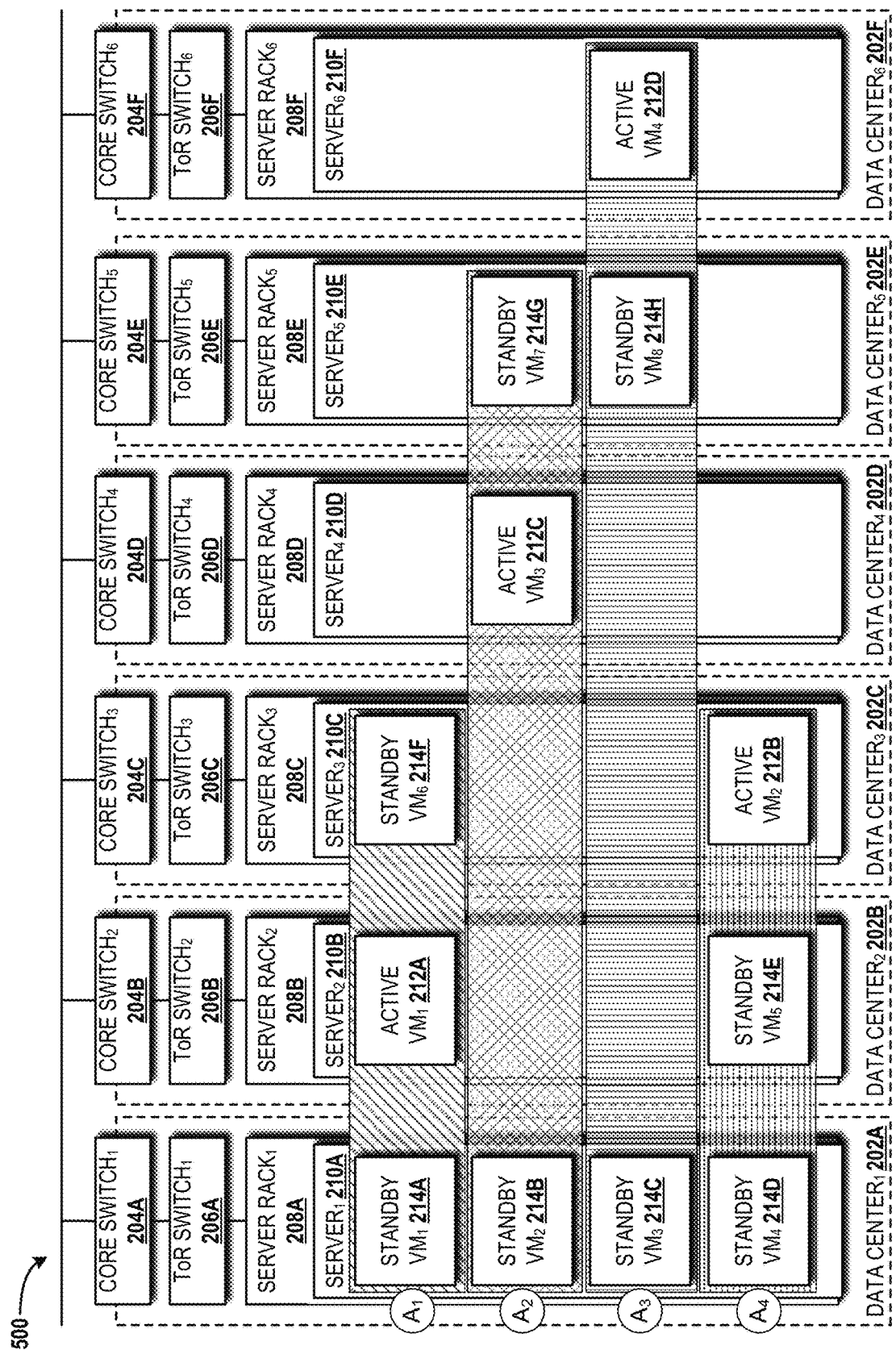
FIG. 5 is a block diagram illustrating aspects of an exemplary placement overlap configuration of the exemplary cloud computing platform, according to an illustrative embodiment.

In FIG. 5, the $B_s$ of the first server 210A in the first data center 202A is one (i.e., only one standby VM 214 can be activated at a time). The failure on entitlement assurance caused by activating two standby VMs 214 depends on $\Delta$. Suppose the first server 210A in the first data center 202A functions, but three servers 210B, 210C, 210D in the second data center 202B, the third data center 202C, and the fourth data center 202D, respectively, fail, the standby VM 214A of $A_1$ will contend with the standby VM 214D of $A_4$ to be activated in the first server 210A in the first data center 202A since there is no $\Delta$ between $A_1$ and $A_4$, and thereby only the first server 210A in the first data center 202A hosts those two standby VMs 214A, 214D in this situation. Meanwhile, the standby VM 214A of $A_1$ does not contend with the standby VM 214B of $A_2$ in the first server 210A since $\Delta$ between $A_1$ and $A_2$ is two, and thereby another standby VM 214G of $A_2$ can be activated in the fifth data center 202E.

With this placement overlap $\Delta$, the contention probability expressed in equation (6) of an application $A_i$ is extended as $\gamma = p'_d p'_r p'_s q_x{}^n \text{Comb}(B-1, B_s, q_y{}^{\Delta B_s})$. Here, m of $q_y{}^{mB_s}$ in equation (6) is replaced with $\Delta$ since some number m VMs can be co-placed with VMs of $A_1$ in the same servers 210, and only the number of unoverlapped servers (i.e., $\Delta$) are considered.

For $A_2$ with $\Delta=1$ in FIG. 5, the probability $\gamma$, which $A_2$ contends with $A_3$ in the first server 210A of the first data center 202A, is $p'_d p'_r p'_s (p_d + p'_d(p_r + p'_r p_s))^2 (p_d + p'_d(p_r + p'_r p_s))$, where $p'_d p'_r p'_s (p_d + p'_d(p_r + p'_r p_s))^2$ is the probability that the first server 210A hosting the second standby VM 214B of $A_2$ functions, but the two servers 210D, 210E in the fourth data center 202D and the fifth data center 202E, respectively, fail, while $(p_d + p'_d(p_r + p'_r p_s))$ is the $\Delta$ server in the sixth data center 202F hosting a VM of $A_3$ fails.

When a placement algorithm makes a placement decision for a given VM of an application, the placement algorithm considers all different combinations with all applications' VMs placed in each server (i.e., $\text{Comb}(B-1, B_s, q_y{}^{mB_s})$) in equation (6)). This is inefficient in a large-scale cloud deployment. To avoid this, one value from the different constant factors $-p_s$, $p_r + p'_r p_s$ and $p_d + p'_d(p_r + p'_r p_s)$ can be chosen conservatively. Specifically, $D = \max p_s, p_r + p'_r p_s, p_d + p'_d(p_r + p'_r p_s)$ can be chosen to replace $q_y$ with D in equation (6). Finally, after $\Delta$ is combined together, the contention probability for $A_i$ is approximately given by $$\gamma = \binom{B-1}{B_s} p'_d p'_r p'_s q_x^n D^{B_s \Delta} \qquad (7)$$

where $$\binom{B-1}{B_s}$$

indicates that $B_s$ out of B−1 standby VMs 214 (except the standby VM of $A_i$) co-placed in a server contend.

Although optimal VM placement is a well-known problem in cloud deployments, and many algorithms to optimize VM placement have been proposed, the concepts and technologies disclosed herein provide a VM placement algorithm that precisely deals with the 1+n application's EAR as well as the resource utilization in a hierarchical cloud infrastructure. Specifically, the disclosed VM placement algorithm can overbook as many standby VMs 214 in the hosting servers 210 as possible, while taking care of its inherent destructive effect on the application EAR regarding the given threshold.

To ensure the EAR threshold requirement, the disclosed VM placement algorithm can keep the high values of both the number of available VM slots 211 for standby activations ($B_s$) and the placement overlap delta ($\Delta$) to avoid simultaneous activations of co-placed standby VMs 214. However, once many such 1+n applications 218 are placed in the cloud computing platform 102, the VM placement overlap and reducing $B_s$ are inevitable. Consequently, the VM placement algorithm places VMs of each arrived application 218 (i.e., first come, first serve), while reducing placement overlap with previously placed VMs of other applications 218 as much as possible, and choosing a particular server 210 that has the largest capacity among the available (candidate) servers 210. $B_s$ and $\Delta$ decrease as more applications 218 are placed in the cloud computing platform 102, until there are no more servers 210 left to meet the EAR threshold of a given application 218.

| Algorithm 1 — Redundancy-aware VM Placement |
| --- |
| 1:  A; # final placements of all applications |
| 2:  $\Delta^* \leftarrow \emptyset$; # $\Delta$ meets EAR threshold T |
| 3:  $B^* \leftarrow \emptyset$; # number of VM slots meets EAR threshold T |
| 4:  $(\Delta^*, B^*) \leftarrow$ DeltaAndSlots(requirements) |
| 5:  for each $v_i \in V$ # for each VM of given application |
| 6:    for each $s_j \in S$ # for each server |
| 7:      if Diversity(A, $v_i$, $s_j$) not met or |
| 8:        CurrDelta(A, $s_j$) < $\Delta^*$ or |
| 9:        $B_{sj}$ < $B^*$ or # of available VM slots of $s_j$ less than $B^*$ |
| 10:       Cap($B_{sj}$, R) > C then # $s_j$ has no capacity |
| 11:       Remove($s_j$, S); |
| 12:    if S = $\emptyset$ then break; # no server found |
| 13:    $S^* \leftarrow$ sort(S); # sort servers by $\Delta$ and $B_s$ |
| 14:    $A \leftarrow A \cup (S^*[0] \leftarrow v_i)$; # get the largest $\Delta$ and $B_s$ |

Algorithm 1 above summarizes a greedy VM placement procedure. In line 4, algorithm 1, executed by at least one processor of the VM placement scheduling system 108 (see FIG. 1), computes the minimum required placement delta ($\Delta^*$) and available VM slots 211 for activating each standby VM ($B^*$) 214 to meet a given EAR threshold using above equations (1), (2), (3), and (7). For each standby VM 214, algorithm 1 filters out any servers 210 that do not meet the constraints in lines 7-10. Algorithm 1 then checks if the VM placement into $s_j$ violates the diversity requirement with the prior placements in A (i.e., Diversity in line 7). Then, algorithm 1 checks if choosing $s_j$ for the current $v_i$ of application 218 does not meet the minimum required placement delta $\Delta^*$ in line 8. Algorithm 1 also checks if the available VM slots 211 for activating standby VMs 214 of $s_j$ is greater than or equal to the minimum required VM slots $B^*$ in line 9. Finally, algorithm 1 checks the capacity of $s_j$ (Cap in line 10 as defined in (4)). It should be noted that algorithm 1 does not show placement for the active VM 212, but algorithm 1 is similar with the standby M placement except algorithm 1 does not check the available VM slots 211 for activation (i.e., line 9). Algorithm 1 ends when no candidate servers 210 are available. Algorithm 1 chooses a server 210 that has the largest $\Delta$ and $B_s$ from the candidate list of servers 210 (lines 13-14).

Algorithm 1 also can include other constraints such as network latency and bandwidth. For network latency, algorithm 1 can check the latency requirement considering the latency between data centers 202. For bandwidth, algorithm 1 can consider the oversubscribed network bandwidths in the data center 202. That is, the higher level links (e.g., between ToR switches 206 and core switches 204) are typically more throttled than the links within a server rack 208. Algorithm 1 keeps monitoring the available bandwidths of each link and the minimum of all links between two nodes to check with the bandwidth requirements.

Figure 6:
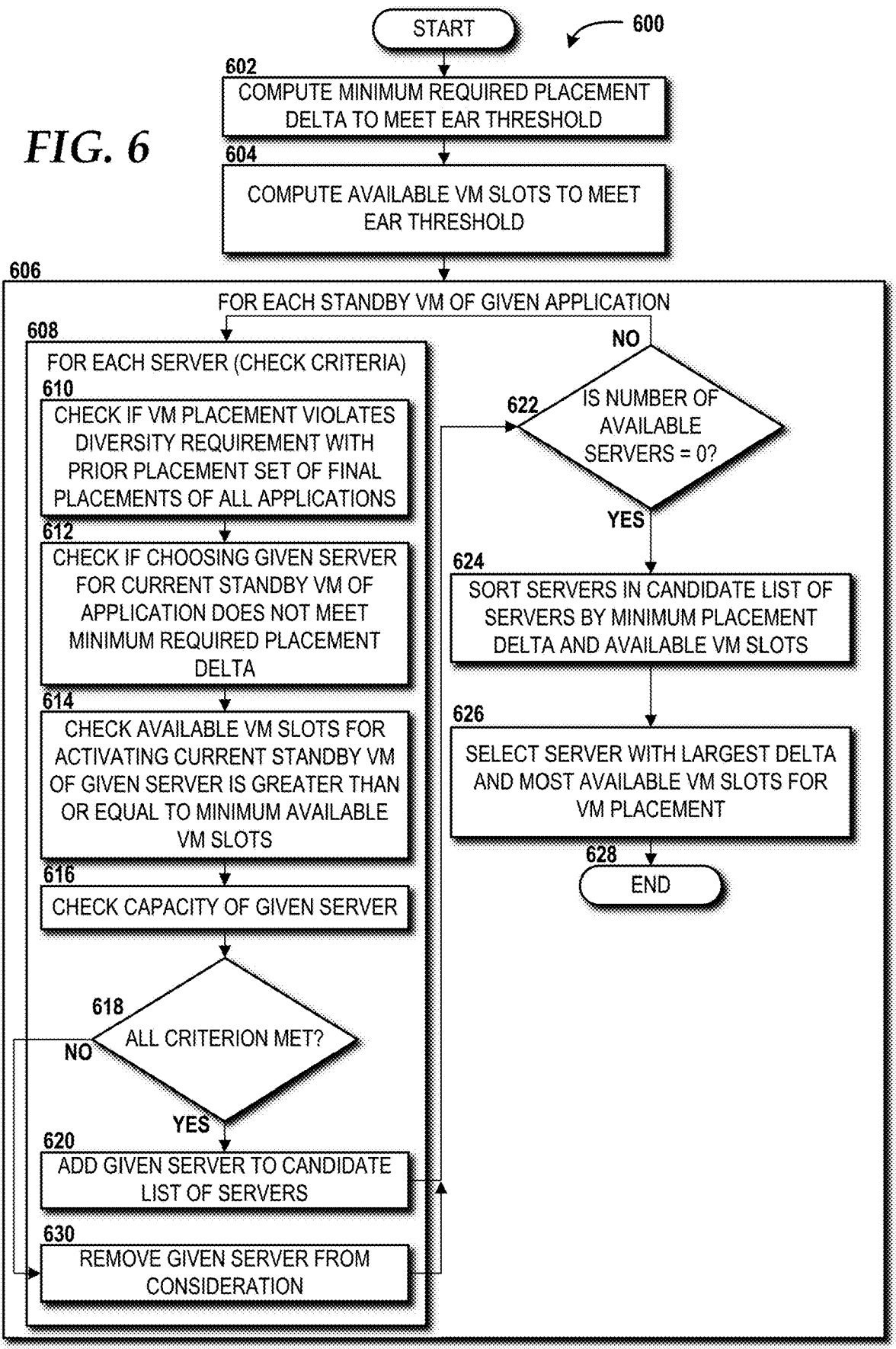
FIG. 6 is a flow diagram illustrating aspects of a method for redundancy-aware VM placement, according to an illustrative embodiment.

Turning now to FIG. 6, aspects of a method 600 for redundancy-aware VM placement will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the VM placement scheduling system 108 to perform operations.

For purposes of illustrating and describing some of the concepts of the present disclosure, the methods disclosed herein are described as being performed, at least in part, by the VM placement scheduling system 108 executing instructions for implementing the algorithms disclosed herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 600 will be described with reference to algorithm 1 above and further reference to FIGS. 1 and 2. The method 600 begins at operation 602, where the VM placement scheduling system 108 computes (see Algorithm 1, line 4) a minimum required replacement delta to meet an EAR threshold. From operation 602, the method 600 proceeds to operation 604, where the VM placement scheduling system 108 computes (see Algorithm 1, line 4) a minimum number of available VM slots 211 for activating each standby VM 214 to meet the EAR threshold.

From operation 604, the method 600 proceeds to operation 606, where the VM placement scheduling system 108 executes a first for loop (see Algorithm 1, line 5) for each standby VM 214 of a given application. Within operation 606, the VM placement scheduling system 108 executes, at operation 608, a second for loop (see Algorithm 1, line 6) for each server 210. Within operation 608, the VM placement scheduling system 108, at operation 610, checks (see Algorithm 1, line 7) if VM placement violates the diversity requirement with prior placement of a set of final placements of all applications 218 deployed within the cloud computing platform 102. From operation 610, the method 600 proceeds to operation 612, where the VM placement scheduling system 108 checks (see Algorithm 1, line 8) if choosing the given server 210 for a current VM of the given application 218 does not meet the minimum required placement delta. From operation 612, the method 600 proceeds to operation 614, where the VM placement scheduling system 108 checks (see Algorithm 1, line 9) the available VM slots 211 for activating a current standby VM 214 of the given server 210 is greater than or equal to the minimum number of available VM slots 211. From operation 614, the method 600 proceeds to operation 616, where the VM placement scheduling system 108 checks (see Algorithm 1, line 10) the capacity of the given server 210.

From operation 616, the method 600 proceeds to operation 618, where the VM placement scheduling system 108 (see Algorithm 1, line 8) determines if all criterion set forth in operations 610, 612, 614, 616 have been met. If the VM placement scheduling system 108 determines that all criteria is met, the method 600 proceeds to operation 620, where the VM placement scheduling system 108 adds the given server 210 to a candidate list of servers 210. From operation 620, the method 600 exits the second for loop (operation 608) and proceeds to operation 622, where the VM placement scheduling system 108 determines if the number of available servers 210 is zero. If not, the method 600 returns to operation 608. If so, the method 600 proceeds to operation 624, where the VM placement scheduling system 108 sorts the servers 210 in the candidate list of servers 210 by the minimum placement delta and the available VM slots 211. From operation 624, the method 600 proceeds to operation 626, where the VM placement scheduling system 108 selects the server 210 with the largest delta and the 2 most available VM slots 211 for VM placement. From operation 626, the method 600 proceeds to operation 628, where the method 600 ends. Returning to operation 618, if the VM placement scheduling system 108 determines that at least one criterion is not met, the method 600 proceeds to operation 630, where the VM placement scheduling system 108 removes the given server 210 from consideration. From operation 630, the method 600 exits the second for loop (operation 608) and proceeds to operation 622. The method 600 then proceeds as described above.

| Algorithm 2 — Standby VM selection for activation |
|---|
| 1:    $A^f \leftarrow \emptyset$; # a set of failed apps due to host failures |
| 2:    for each $s_i \in S^f$ # for each failed server |
| 3:      if $s_i$ includes $v^a$s then # if $s_i$ has active VMs |
| 4:        $A^f \leftarrow A^f \cup$ applications of $v^a$s |
| 5:    $S \leftarrow$ Avail($A^f$); # get servers hosting standby VMs of $A^f$ |
| 6:    $S \leftarrow$ Sort(S); # sort servers by available VM slots |
| 7:    $A^f \leftarrow$ Sort($A^f$); # sort failed apps by EAR threshold |
| 8:    for each $A_i \in A^f$ # for each failed application |
| 9:      for each $s_j \in S$ # for each server hosting standby VMs |
| 10:        if $s_j$ has any $v^s$ of $A_i$ then # if $s_j$ has a standby of $A_i$ |
| 11:          ActivateStandby($v^s$, $s_j$); |
| 12:          DeductAvailableSlot($s_j$); |
| 13:          Break; |
| 14:      if $\Sigma_{sj \in S} B_{sj} = 0$ then break; |

When multiple server 210 failures occur, many 1+n applications 218 can be affected. For example, the failure of a data center 202 triggers the situation that all server racks 208 and servers 210 in the data center 202 are inaccessible, and therefore all active VMs 212 hosted in those servers 210 also are not available. Once the VM placement scheduling system 108 captures such failed applications 218 at runtime, the VM placement scheduling system 108 finds the servers 210 of corresponding standby VMs 214 of those failed applications 218 and activates the standby VMs 214 as active VMs 212 to continue running those standby VMs 214 until the failed host can be repaired. The selection of standby VMs 214 for activation might not be trivial if many applications 218 are affected from the failures and many standby VMs 214 are overbooked and the placement of applications 218 are overlapped across multiple servers 210.

Algorithm 2 above presents a heuristic standby selection procedure when host failures occur. The VM placement scheduling system 108 first captures all the affected applications 218 (see algorithm 2, lines 1-4) and available servers 210 which are hosting standby VMs 214 of affected applications 218 in algorithm 2 at line 5. Then, the VM placement scheduling system 108 sorts the servers 210 by the number of available VM slots 211 for standby VM 214 activations ($B_s$) in descending order (see algorithm 2, line 6). The VM placement scheduling system 108 also sorts the affected applications 218 by EAR threshold in descending order (see algorithm 2, line 7) (i.e., dealing with the most critical application 218 first). For each affected application 218, the VM placement scheduling system 108 attempts to get a server 210 that hosts any one of the standby VMs 214 of the application 218 (see algorithm 2, lines 8-10). If a server 210 is found, algorithm 2 activates the standby VM 214 in the server 210 (see algorithm 2, line 11), and decreases the number of available VM slots 211 of the server 210 (see algorithm 2, line 12). It should be noted that only one standby VM 214 of each affected application 218 can be activated in each server 210, and the VM placement scheduling system 108 allows standby VMs 214 of other affected applications 218 to be activated in each server 210. The VM placement scheduling system 108 stops the heuristic standby selection procedure once no VM slots 211 are available in servers 210 (see algorithm 2, line 14).

The VM placement scheduling system 108 can validate if all failed applications 218 can be assured of their entitlements by comparing the total number of available VM slots 211 for standby activations of all servers 210, where standby VMs 214 of failed applications 218 are re-hosted, to the number of failed applications 218 (i.e., $|A_f|$, where $|A_f|$ is the number of failed applications 218, and S is a set of servers hosting standby VMs). If this is validated, the VM placement scheduling system 108 can determine the server 210 in which to activate each standby VM 214 even more efficiently (i.e., do not need sorting applications 218 and servers 210, but instead randomly select).

Figure 7:
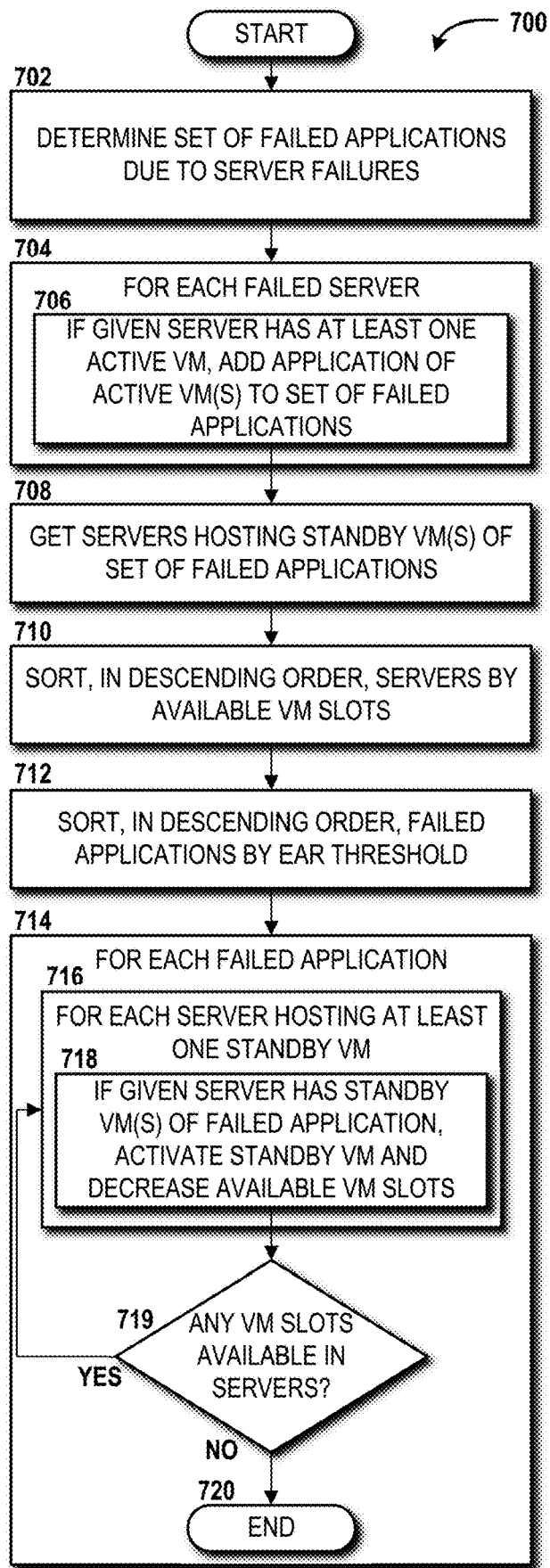
FIG. 7 is a flow diagram illustrating aspects of a method for heuristic standby selection, according to an illustrative embodiment.

Turning now to FIG. 7, a method 700 for heuristic standby selection will be described, according to an illustrative embodiment. The method 700 will be described with reference to algorithm 2 above and further reference to FIGS. 1 and 2. The method 700 begins at operation 702, where the VM placement scheduling system 108 determines a set of failed applications 218 due to server 210 failures (see algorithm 2, line 1). From operation 702, the method 700 proceeds to operation 704, where the VM placement scheduling system 108 executes a first for loop (see algorithm 2, line 2) for each failed server 210. Within the first for loop, at operation 706, if the given server 210 has at least one active VM 212, the VM placement scheduling system 108 adds the application 218 of the active VM(s) 214 to the set of failed applications 218 (see algorithm 2, lines 3, 4).

From operation 706, the method 700 exits the first for loop and proceeds to operation 708, where the VM placement scheduling system 108 gets the servers 210 hosting standby VM(s) 214 of the set of failed applications 218 (see algorithm 2, line 5). From operation 708, the method 700 proceeds to operation 710, where the VM placement scheduling system 108 sorts, in descending order, the servers 210 available VM slots 211 (see algorithm 2, line 6). From operation 710, the method 700 proceeds to operation 712, where the VM placement scheduling system 108 sorts, in descending order, failed applications 218 by the EAR threshold (see algorithm 2, line 7).

From operation 712, the method 700 proceeds to operation 714, wherein the VM placement scheduling system 108 executes a second for loop (see algorithm 2, line 8) for each failed application 218. Within the second for loop, at operation 716, the VM placement scheduling system 108 executes a third for loop (see algorithm 2, line 9) for each server 210 hosting at least one standby VM 214. Within the third for loop, at operation 718, if (see algorithm 2, line 10) the given failed server 210 has at least one standby VM 214 of the failed application 218, the VM placement scheduling system 108 activates (see algorithm 2, line 11) the standby VM(s) 214 and decreases (see algorithm 2, line 12) the number of available VM slots 211.

From operation 718, the method 700 exits the third for loop and proceeds to operation 719, where the VM placement scheduling system 108 determines if any VM slots 211 are available in the servers (see algorithm 2, line 14). If the VM placement scheduling system 108 determines, at operation 719, that additional VM slots 211 are available in the servers 210, the method 700 returns to operation 716 and the method 700 proceeds as described above. If, however, the VM placement scheduling system 108 determines, at operation 718, that additional VM slots are not available in the servers, the method 700 proceeds to operation 720, where the method 700 ends.

Figure 8:
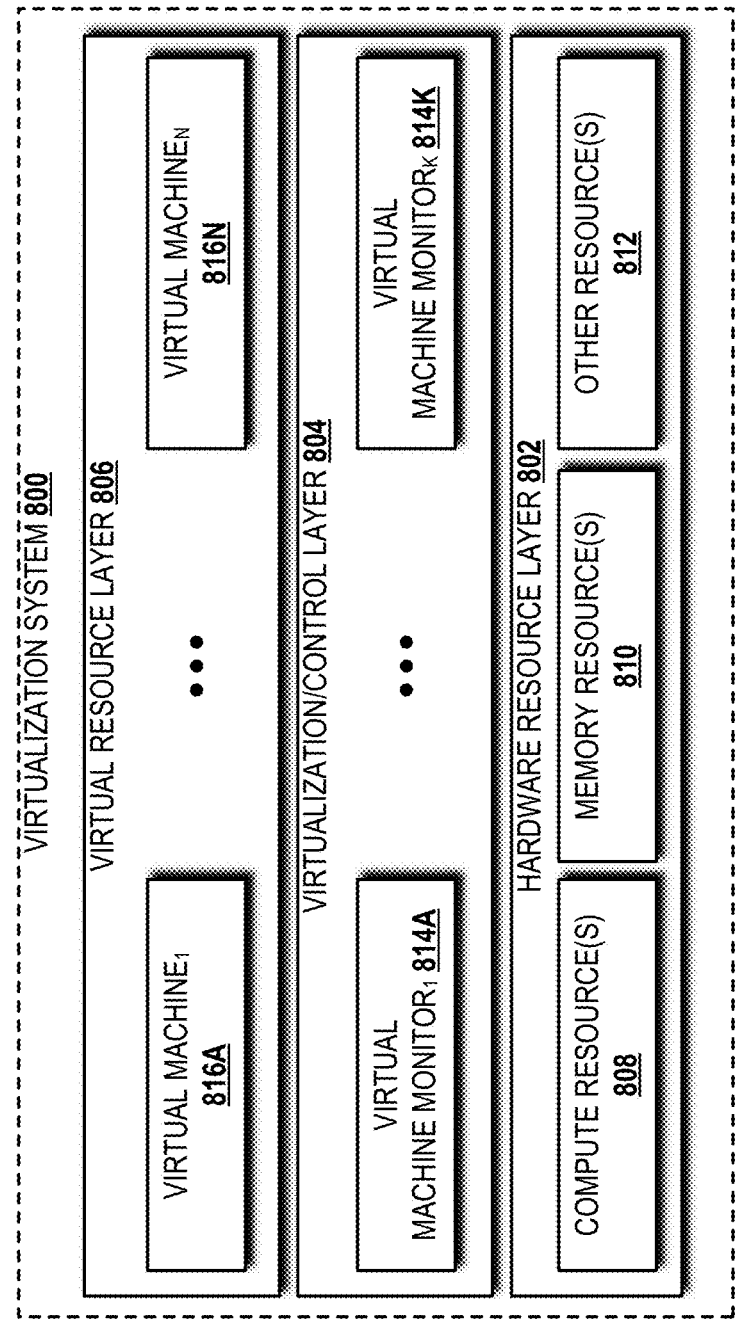
FIG. 8 is a block diagram illustrating a virtualization system capable of implementing aspects of the exemplary cloud infrastructure for the exemplary cloud computing platform, according to an illustrative embodiment.

Turning now to FIG. 8, a virtualization system 800 capable of implementing aspects of the cloud infrastructure 200 for the cloud computing platform 102 will be described, according to an illustrative embodiment. The illustrated virtualization system 800 includes a hardware resource layer 802, a virtualization/control layer 804, and a virtual resource layer 806 that work together to perform operations as will be described in detail herein. While connections are shown between some of the components illustrated in FIG. 8, it should be understood that some, none, or all of the components illustrated in FIG. 8 can be configured to interact with one other to carry out various functions described herein. In some embodiments, the components are arranged so as to communicate via one or more networks (best shown in FIG. 9). Thus, it should be understood that FIG. 8 and the following description are intended to provide a general understanding of a suitable environment in which various aspects of embodiments can be implemented, and should not be construed as being limiting in any way.

The hardware resource layer 802 provides hardware resources, which, in the illustrated embodiment, include one or more compute resources 808, one or more memory resources 810, and one or more other resources 812. The compute resource(s) 808 can include one or more hardware components that perform computations to process data, and/or to execute computer-executable instructions of one or more application programs, operating systems, and/or other software. The compute resources 808 can include one or more central processing units ("CPUs") configured with one or more processing cores. The compute resources 808 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 808 can include one or more discrete GPUs. In some other embodiments, the compute resources 808 can include CPU and GPU components that are configured in accordance with a co-processing CPU/GPU computing model, wherein the sequential part of an application executes on the CPU and the computationally-intensive part is accelerated by the GPU. The compute resources 808 can include one or more system-on-chip ("SoC") components along with one or more other components, including, for example, one or more of the memory resources 810, and/or one or more of the other resources 812. In some embodiments, the compute resources 808 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 808 can be or can include one or more hardware components architected in accordance with an ARM architecture, available for license from ARM HOLDINGS of Cambridge, United Kingdom. Alternatively, the compute resources 808 can be or can include one or more hardware components architected in accordance with an x86 architecture, such an architecture available from INTEL CORPORATION of Mountain View, Calif., and others. Those skilled in the art will appreciate the implementation of the compute resources 808 can utilize various computation architectures, and as such, the compute resources 808 should not be construed as being limited to any particular computation architecture or combination of computation architectures, including those explicitly disclosed herein.

The memory resource(s) 810 can include one or more hardware components that perform storage operations, including temporary or permanent storage operations. In some embodiments, the memory resource(s) 810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 808.

The other resource(s) 812 can include any other hardware resources that can be utilized by the compute resources(s) 808 and/or the memory resource(s) 810 to perform operations described herein. The other resource(s) 812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 802 can be virtualized by one or more virtual machine monitors ("VMMs") 814A-814K (also known as "hypervisors"; hereinafter "VMMs 814") operating within the virtualization/control layer 804 to manage one or more virtual resources that reside in the virtual resource layer 806. The VMMs 814 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816"). The VMs 816 can include the active VMs 212 and the standby VMs 214 (see FIG. 2). Each of the VMs 816 can execute multiple applications, including the applications 218.

Figure 9:
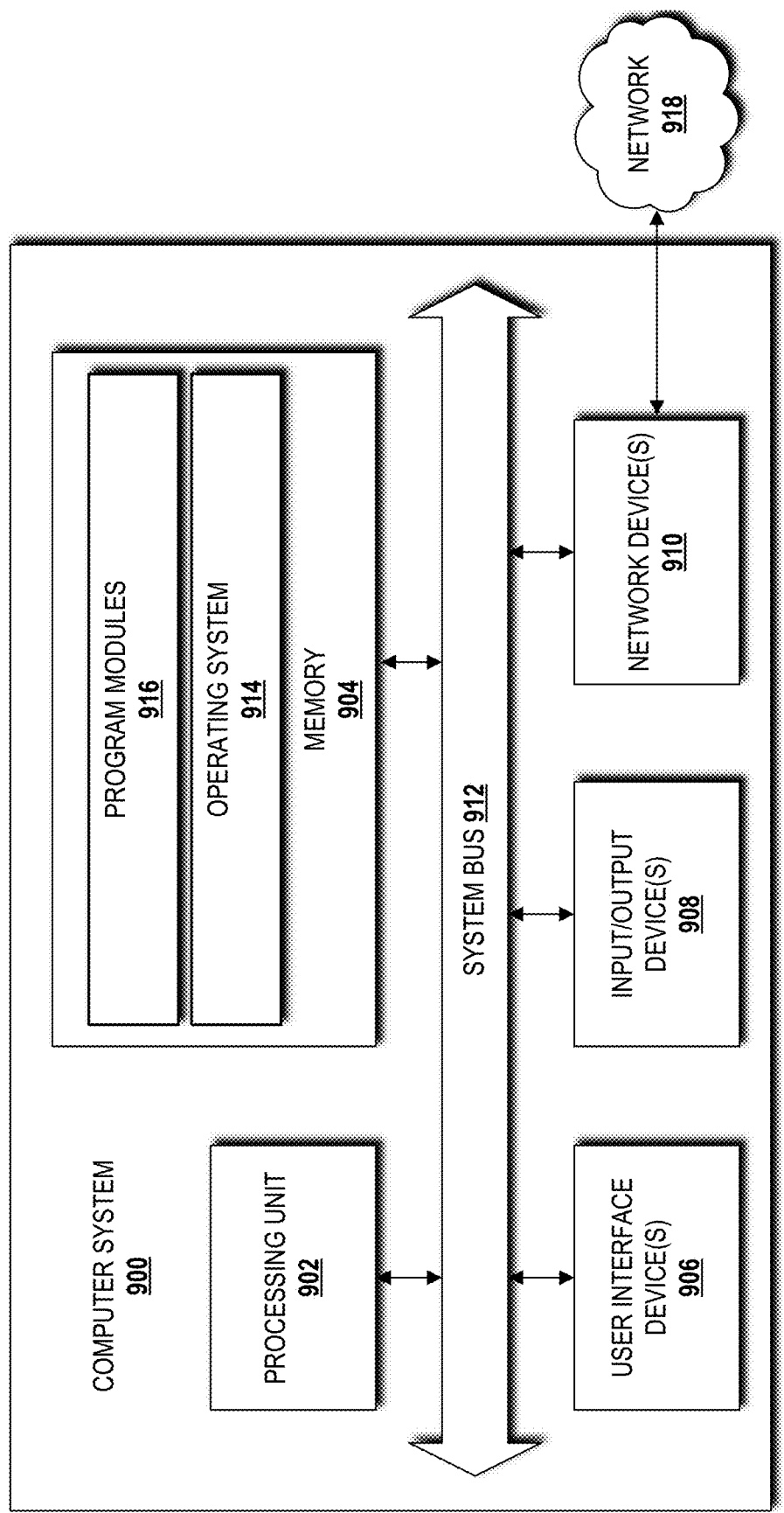
FIG. 9 is a block diagram illustrating an example computer system capable of implementing aspects of the embodiments presented herein.

FIG. 9 is a block diagram illustrating a computer system 900 configured to provide the functionality in accordance with various embodiments of the concepts and technologies disclosed herein. It should be understood, however, that modification to the architecture may be made to facilitate certain interactions among elements described herein.

The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 904 communicates with the processing unit 902 via the system bus 912. In some embodiments, the memory 904 is operatively connected to a memory controller (not shown) that enables communication with the processing unit 902 via the system bus 912. The illustrated memory 904 includes an operating system 914 and one or more program modules 916. The operating system 914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 916 may include various software and/or program modules to perform the various operations described herein. The program modules 916 and/or other programs can be embodied in computer-readable media containing instructions that, when executed by the processing unit 902, perform various operations such as those described herein. According to embodiments, the program modules 916 may be embodied in hardware, software, firmware, or any combination thereof.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium" and variations thereof does not include waves or signals per se and/or communication media.

The user interface devices 906 may include one or more devices with which a user accesses the computer system 900. The user interface devices 906 may include, but are not limited to, computers, servers, PDAs, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer.

The network devices 910 enable the computer system 900 to communicate with other networks or remote systems via a network 918. Examples of the network devices 910 include, but are not limited to, a modem, a radio frequency ("RF") or infrared ("IR") transceiver, a telephonic interface, a bridge, a router, or a network card. The network 918 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 918 may be a wired network such as, but not limited to, a Wide Area Network ("WAN"), a wired Personal Area Network ("PAN"), or a wired Metropolitan Area Network ("MAN"). The network 918 can include one or more networks operating within the cloud computing platform 102, within one or more data centers 202, between one or more data centers 202, between one or more server racks 208, and/or between one or more servers 210. Moreover, the network 918 can include one or more core switches 204 and one or more ToR switches 206.

Based on the foregoing, it should be appreciated that concepts and technologies directed to virtual redundancy for active-standby cloud applications have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A virtual machine placement scheduling system, for managing virtual machine placement scheduling within a cloud computing platform, the virtual machine placement scheduling system comprising:
   a processor; and
   a memory having instructions stored thereon that, when executed by the processor, cause the processor to perform operations comprising
   computing, for each standby virtual machine of a plurality of standby virtual machines available in the cloud computing platform, a minimum required placement overlap delta to meet an entitlement assurance rate threshold,
   computing a minimum number of available virtual machine slots in the cloud computing platform for activating each standby virtual machine to meet the entitlement assurance rate threshold,
   sorting, in descending order, a candidate list of servers by the minimum required placement overlap delta and a number of available virtual machine slots, and
   selecting, from the candidate list of servers, a candidate server.

2. The virtual machine placement scheduling system of claim 1, wherein the operations further comprise, for each standby virtual machine of a given application, filtering out any server of a plurality of servers operating in the cloud computing platform that does not meet a criteria.

3. The virtual machine placement scheduling system of claim 2, wherein the criteria comprises a diversity requirement.

4. The virtual machine placement scheduling system of claim 2, wherein the criteria comprises meeting the minimum required placement overlap delta.

5. The virtual machine placement scheduling system of claim 2, wherein the criteria comprises the number of available virtual machine slots being greater than or equal to the minimum number of available virtual machine slots.

6. The virtual machine placement scheduling system of claim 2, wherein the criteria comprises being below a capacity.

7. A method comprising:
   computing, by a virtual machine placement scheduling system comprising a processor, for each standby virtual machine of a plurality of standby virtual machines available in a cloud computing platform, a minimum required placement overlap delta to meet an entitlement assurance rate threshold;
   computing, by the virtual machine placement scheduling system, a minimum number of available virtual machine slots in the cloud computing platform for activating each standby virtual machine to meet the entitlement assurance rate threshold;
   sorting, by the virtual machine placement scheduling system, in descending order, a candidate list of servers by the minimum required placement overlap delta and a number of available virtual machine slots; and
   selecting, from the candidate list of servers, a candidate server.

8. The method of claim 7, further comprising, for each standby virtual machine of a given application, filtering out any server of a plurality of servers operating in the cloud computing platform that does not meet a criteria.

9. The method of claim 8, wherein the criteria comprises a diversity requirement.

10. The method of claim 8, wherein the criteria comprises meeting the minimum required placement overlap delta.

11. The method of claim 8, wherein the criteria comprises the number of available virtual machine slots being greater than or equal to the minimum number of available virtual machine slots.

12. The method of claim 8, wherein the criteria comprises being below a capacity.

13. A computer-readable storage medium having instructions stored thereon that, when executed by a processor of a virtual machine placement scheduling system, cause the processor to perform operations comprising:
   computing, for each standby virtual machine of a plurality of standby virtual machines available in a cloud computing platform, a minimum required placement overlap delta to meet an entitlement assurance rate threshold;

computing a minimum number of available virtual machine slots in the cloud computing platform for activating each standby virtual machine to meet the entitlement assurance rate threshold;

sorting, in descending order, a candidate list of servers by the minimum required placement overlap delta and a number of available virtual machine slots; and selecting, from the candidate list of servers, a candidate server.

14. The computer-readable storage medium of claim 13, wherein the operations further comprise, for each standby virtual machine of a given application, filtering out any server of a plurality of servers operating in the cloud computing platform that does not meet a criteria.

15. The computer-readable storage medium of claim 14, wherein the criteria comprises a diversity requirement.

16. The computer-readable storage medium of claim 14, wherein the criteria comprises meeting the minimum required placement overlap delta.

17. The computer-readable storage medium of claim 14, wherein the criteria comprises the number of available virtual machine slots being greater than or equal to the minimum number of available virtual machine slots.

\* \* \* \* \*